(12) United States Patent
Laederich et al.

(10) Patent No.: US 6,183,720 B1
(45) Date of Patent: Feb. 6, 2001

(54) PROCESS AND APPARATUS FOR PRODUCING HIGH-PURITY CHEMICALS FOR THE MICROELECTRONICS INDUSTRY

(75) Inventors: Thierry Laederich; Hervé Dulphy, both of Le Pont de Claix (FR)

(73) Assignee: Air Liquide Electronics Labeille, Le Pont de Claix (FR)

( * ) Notice: Under 35 U.S.C. 154(b), the term of this patent shall be extended for 0 days.

(21) Appl. No.: 09/056,765

(22) Filed: Apr. 8, 1998

(30) Foreign Application Priority Data

Apr. 11, 1997 (FR) ..................................................... 97 04499

(51) Int. Cl.[7] ................................. C01B 7/07; C01B 7/19; C01C 1/02
(52) U.S. Cl. .................. 423/658.5; 423/352; 423/240 R; 423/238; 423/484; 423/488
(58) Field of Search ..................................... 423/483, 484, 423/352, 658.5, 240 R, 237, 238, 481, 488

(56) References Cited

U.S. PATENT DOCUMENTS

| | | |
|---|---|---|
| 4,349,524 | 9/1982 | Yamashita et al. . |
| 5,496,778 | 3/1996 | Hoffman et al. . |
| 5,785,820 * | 7/1998 | Hoffman et al. ................... 202/158 |
| 5,846,387 * | 12/1998 | Hoffman et al. ................... 203/40 |
| 5,980,850 * | 11/1999 | Lebl ................................. 423/394.2 |
| 6,001,223 * | 12/1999 | Hoffman et al. ................... 203/12 |
| 6,015,477 * | 1/2000 | Hoffman et al. ................... 203/13 |

FOREIGN PATENT DOCUMENTS

| | | |
|---|---|---|
| 83754 | 8/1971 | (DE) . |
| 210480 | 2/1987 | (EP) . |

* cited by examiner

Primary Examiner—Tom Dunn
Assistant Examiner—Elin A Warn
(74) Attorney, Agent, or Firm—Burns, Doane, Swecker & Mathis, L.L.P.

(57) ABSTRACT

A process for producing a high-purity liquid chemical is provided. A chemical gas is successively purified over first and second purification columns by passing, countercurrently, a scrubbing solution of initially deionized high-purity water through the first and second purification columns, or by passing, countercurrently, a first scrubbing solution of initially deionized high-purity water through the first column and a second scrubbing solution of initially deionized water through the second column. Each of the scrubbing solutions gradually becomes a spent scrubbing solution loaded with impurity. A high-purity chemical gas leaves the second purification column with a low content of metallic elements. The high-purity chemical gas is subsequently dissolved in a liquid in a dissolution column including a top and a bottom. The liquid at the bottom of the dissolution column is collected and continuously recirculated, and is enriched with purified chemical gas, thereby forming a high-purity liquid chemical. The high-purity liquid chemical is subsequently distributed when a desired concentration of dissolved gas has been reached.

18 Claims, 6 Drawing Sheets

PROCESS AND APPARATUS FOR PRODUCING HIGH-PURITY CHEMICALS FOR THE MICROELECTRONICS INDUSTRY

This application claims priority under 35 U.S.C. §§119 and/or 365 to 97-04499 filed in France on Apr. 11, 1997; the entire content of which is hereby incorporated by reference.

BACKGROUND OF THE INVENTION (i) Field of the Invention

The present invention relates to a process and an apparatus for producing high-purity chemicals for the microelectronics industry by dissolving at least one chemical gas in ultrapure water.

(ii) Description of Related Art

In order to produce ultrapure chemicals, such as aqueous ammonia, hydrochloric acid and hydrofluoric acid, it is known to use, respectively, "industrial"-grade anhydrous ammonia gas, gaseous hydrogen chloride and gaseous hydrogen fluoride and to purify them, in particular to purify them of their metallic impurities by scrubbing over a column packed with a solution saturated with the same gas in high-purity deionized water. A technique of this type is, for example, described in Patent Application WO 96/39265.

The technology described in the aforementioned patent application, which has marked an important step forward for allowing delivery to the integrated-circuit production site of the ultrapure chemicals which allow these ever smaller integrated circuits to be fabricated, still has, however, a certain number of drawbacks when a corresponding system is operated on a customer's site, for example an integrated-circuit fabrication ("wafer fab") plant.

A first problem encountered relates to the dissolving of the gas, which is accomplished, using the technology described in this patent, by injecting it directly into water. This results in a temperature rise and may cause sudden pressure variations due to intense stirring of the liquid. Furthermore, since the gas does not dissolve in the water instantaneously, this generates swirling in the liquid tank, which consequently means that the measurement of the titre of the solution is not always entirely correct.

Another drawback of the process described in this patent is that its operation is not continuous, thereby requiring, when the desired titre or desired concentration is reached, the content of the product container to be transferred to a storage tank (so-called batch process). Furthermore, the use of a heat exchanger as described in this patent application may possibly pose a problem when connecting the heat exchanger in the container for the product formed, in contact with coolant, which may be a source of pollution.

Finally, because of the always limited effectiveness of a mist eliminator placed at the top of a packed column, it is in some cases possible that an aerosol of a solution of the scrubbing liquid with the purified gas can in some situations pass through this mist eliminator, leading to a level of gas purity which may be limited.

SUMMARY OF THE INVENTION

The invention makes it possible to avoid these drawbacks. For this purpose, the process and apparatus according to the invention are essentially characterized by scrubbing the gas, before dissolving it, in at least two scrubbing columns, which are placed in series and preferably provided with packings, as well as by using a packed column in order to dissolve the gas in the water.

The present invention applies more particularly to the production of ultrapure liquid chemicals, such as aqueous ammonia, hydrochloric acid and hydrofluoric acid, but also to any other chemical of this type which may be obtained initially in gaseous form, preferably from a liquid phase.

Preferably, the starting material is a chemical in liquid but anhydrous form such as, for example, anhydrous ammonia in liquid form (for example at a pressure of about 5 bar and at ambient temperature) so as to be able, by vaporizing the product, to recover a vapour from which a certain number of impurities has already been removed, in a manner already described in U.S. Pat. No. 5,496,778. Next, in a first step, the gas obtained, generally after vaporizing the chemical stored in liquid form, is first of all scrubbed and then, in a second step, dissolved in deionized ultrapure water.

With regard to the step of scrubbing the gas, any type of surface may be used, such as trays, but it will be preferable to use packings. As in distillation columns, these surfaces have the purpose of increasing liquid/gas contact so as to increase the exchange between the two substances, liquid and gas. The packings which may be used are, for example, Raschig rings, Pall rings, etc. The purpose of these surfaces is to increase the area of contact between liquid and gas and, according to the invention, the purpose is preferably to increase this contact area by a factor equal to or greater than 4. As a general rule, increasing the contact area means increasing the contact area with respect to the lateral area of the unpacked column (since without any packing in a column the contact between liquid and gas essentially takes place on the lateral surface of this column). Thus, increasing the contact area by four means fitting a number of Raschig rings (or any other surface) whose total contact area is equal to three times the lateral area of the column. However, it will be preferred to increase this contact area by a factor of at least 10. In practice, plastic Raschig rings will be used and a plastic resistant to the chemical which it is desired to produce, such as aqueous ammonia, hydrofluoric acid,, hydrochloric acid, etc., will be chosen. Among suitable plastics are, in general, polyolefins and, preferably, polyethylene and/or polypropylene, which are substituted or unsubstituted, as well as their copolymers. Also suitable, in general, are the products sold by the company DuPont de Nemours under the name "PFA" or perfluoroalkoxy, as well as any type of polytetrafluoroethylene, this being optionally substituted, their copolymers, etc., all these materials being suitable when, in contact with the chemicals used, they do not produce residues, in particular residues of the metallic-elements type which are the main elements that it is important to remove from these ultrapure chemicals intended for the semiconductor industry.

In this gas-scrubbing step, and in the subsequent dissolving step, the flow rate of chemical gas to be scrubbed and then diluted is preferably less than 60 $m^3$ per hour and preferably between 30 and 45 $m^3$ per hour while the pressure of this gas will preferably be between about 1 and 3 bar in absolute value (about 0 to 2 bar in relative value).

The minimum packing volume (Raschig or Pall rings) that will preferably be used in all of the 2 or 3 scrubbing columns will be at least 20 liters and preferably at least 40 liters. The flow rate of the scrubbing solution will preferably be at least 5 liters per minute with draining at the bottom of the column collector at about 1 liter per hour.

With regard to the next step, in which the purified gas is dissolved in the deionized ultrapure water, a single column without a mist eliminator will preferably be used, the packing volume being at least one liter, preferably at least 2.5 liters and more preferably at least 4 liters, with a flow rate of dissolving solution, i.e. generally ultrapure deionized water, which is sufficiently high to avoid the column heating up, so as to keep the temperature of this column, in which the gas is dissolved, preferably below 30° C. and more preferably so as to keep the temperature of this column at a temperature close to ambient temperature, i.e. generally between 20° C. and 25° C.

The tank containing the chemical liquid, which at the end of the operation has the desired titre, is generally placed beneath this gas-dissolving column and, in general, the gas is introduced at the base of the column, preventing this gas from coming directly into contact with the chemical liquid in the tank using any suitable means such as, for example, a U-tube, a spiral, etc., while keeping a pressure at the top of the column approximately equal to that above the liquid in the tank so as to prevent the gas from passing through this U-tube or spiral. In this way, the gas follows a forced path towards the top of the column so as to promote liquid/gas exchange and to effect the desired dissolution.

According to a preferred embodiment, the step of purifying the gas before it is dissolved takes place in at least two successive columns, placed in series, the content of the bottom part of the collector of the first column (which receives the gas from the container) being regularly purged, on account of the impurities which accumulate therein, and replaced by the content of the collector of the next column (and so on, if there are several columns), this content having much fewer impurities, because it results from a second scrubbing of the gas. This makes it possible, on the one hand, to avoid loss of gas (as the liquid is already saturated with gas, unlike what would happen if the liquid of the collector were to be replaced by clean water) and, on the other hand, to save time, since the gas is directly purified by an already saturated solution.

The invention will be more clearly understood with the help of the following embodiments given by way of non-limiting example, together with the figures which represent:

DETAILED DESCRIPTION OF PREFERRED EMBODIMENTS

Figure 1:
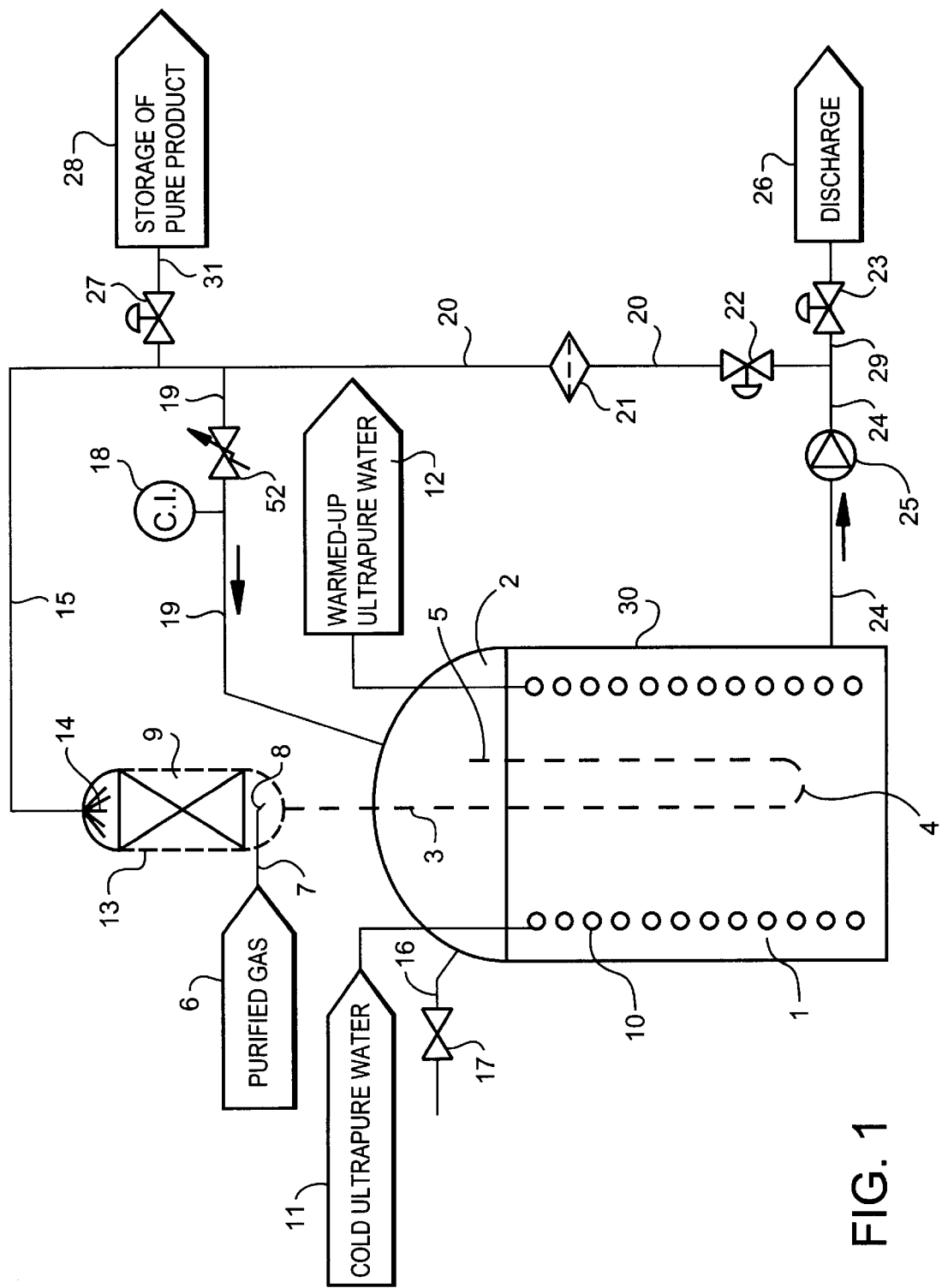
FIG. 1, a diagram showing the gas being dissolved in water, using a column.

FIG. 1 shows an embodiment of the invention for preparing in a discontinuous manner (in batch mode) an ultrapure liquid chemical. The purified gas (6) coming from the supply of purified gas, as will be described below, is injected via the line (7) and the nozzle (8) into the column (13) provided with packings (9). The lower part of the column (13) is provided with a line (3) which goes into the liquid (1) held in the container (30) in which this ultrapure chemical liquid is produced, this line (3) continuing via a U-shaped end (4) which rises and terminates at (5) above the level of liquid in a zone (2) of gas, generally ultrapure nitrogen, (the feed method of which has not been shown in the figure). The container (30) also includes a line (16), for supplying ultrapure deionized water, controlled by a valve (17). Inside this container is a heat exchanger (10) which makes it possible to keep the bath temperature substantially constant, preferably between 20 and 25° C. This exchanger is, according to a preferred variant of the invention, a plastic exchanger comprising a primary circuit and secondary circuit of a type similar to the cooling circuits normally used in the nuclear industry. It is shown in FIG. 1 as a coil which is wound around along the internal wall of the container (30) and is fed, on one side, with cold ultrapure water (11) which, after being warmed up, is removed as warmed-up ultrapure water (12). At the lower part of the container (30) there is a line (24) which is used to draw off the ultrapure chemical and to make it flow into the system by means of the pump (25), the line (24) subsequently splitting into two branches, a first branch (29) connected via a valve (23) to the discharge (26) and a branch (20) which includes a valve (22) and then a filter (21), this line (20) also splitting, into three lines, the first (19) to which a flow control valve (52) and a device (18) for measuring the concentration of the titre of the solution are connected, the line (19) returning to the upper part of the container (30) so as to send the excess chemical back into the vessel (30), a second line (15) terminating in a spray head (14), at the top of the column (13), which sprays the purified gas (6) as a countercurrent to the flow in the packings (9) and, finally, a third line (31) connected via the valve (27) to the container (28) for storing the pure product. The deionized water, which is charged with, purified gas in the packings (9), flows out into the line (3) and fills the container (30) via the overflow (5). The purified gas (6), which cannot flow out via this liquid-filled line (3), is therefore forced through the top of the column, thereby promoting liquid/gas exchange in the packings (9). The product is circulated in a closed circuit via the line (20) and then the line (15) by means of the pump (25), some of the liquid product thus formed being tapped off into the line (19) and its concentration (or titre) being measured by a concentration-measuring device (18) so as to compare the measured value with the desired value. When the desired concentration has been obtained, a signal is generated by the device (18) for measuring the concentration to a controller (not shown in the figure) for controlling all the apparatus described in FIG. 1, which stops the circulating pump, the product then being ready to be discharged via the line (24), the line (20) and the line (31) to the container (28) for storing the pure product. When the container (30) has been emptied, it is filled again using the desired quantity of deionized water via the line (16) and the valve (17) and the product then starts to circulate again in the circuit, described above, so as gradually to dilute the purified gas in the water and to obtain the desired titre.

Figure 2:
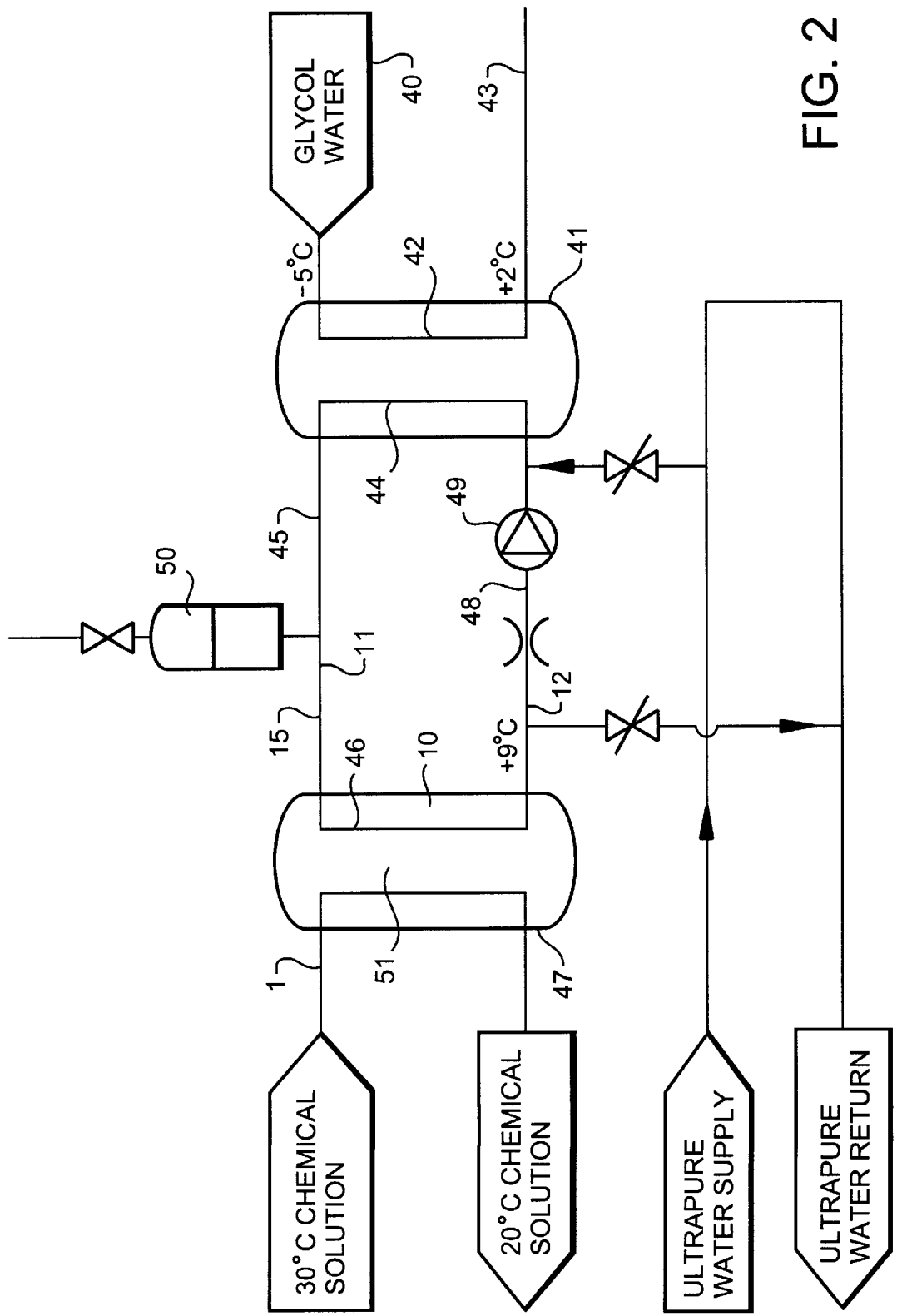
FIG. 2, a feed loop of the absorption heat exchanger.

FIG. 2 shows very diagrammatically a feed loop of the heat exchanger (10) of FIG. 1, which exchanger is preferably of the type used in the nuclear industry, i.e. with a primary circuit and a secondary circuit which are completely sealed and separated from each other so as to avoid any contamination of the liquid product to be manufactured (ultrapure liquid product for the microelectronics industry) with the water for cooling the container (30). In this figure, the same components as those in FIG. 1 bear the same references. A tank (40) of glycol water which is, for example, at a temperature of −5° C. and is made to flow through the primary exchanger (41), in the primary circuit (42) of the latter, so as subsequently to be removed via the line (43) at a temperature which in practice may be +2° C. The secondary part (44) of the primary exchanger (41) includes a circuit for ultrapure water which flows permanently, in the secondary of this primary exchanger, in the line (45) connected to the primary circuit (46) of the secondary exchanger (47), the lower end of this secondary exchanger (46) being connected to the line (48) and then to the pump (49) which circulates this ultrapure water in the circuit. This circuit includes a purger (50) which makes it possible from time to time to purge the ultrapure-water circuit and to replace this water with a new charge of ultrapure water. The secondary circuit (51) of the secondary exchanger (47) receives the ultrapure chemical liquid (1) so as to lower its temperature from a temperature of, for example, 30° C. ("30° C. chemical solution" in FIG. 2) to a temperature of about 20° C. ("20° C. chemical solution" in FIG. 2). The deionized water may be cooled by glycol water in a plate or tube heat exchanger.

Figure 3:
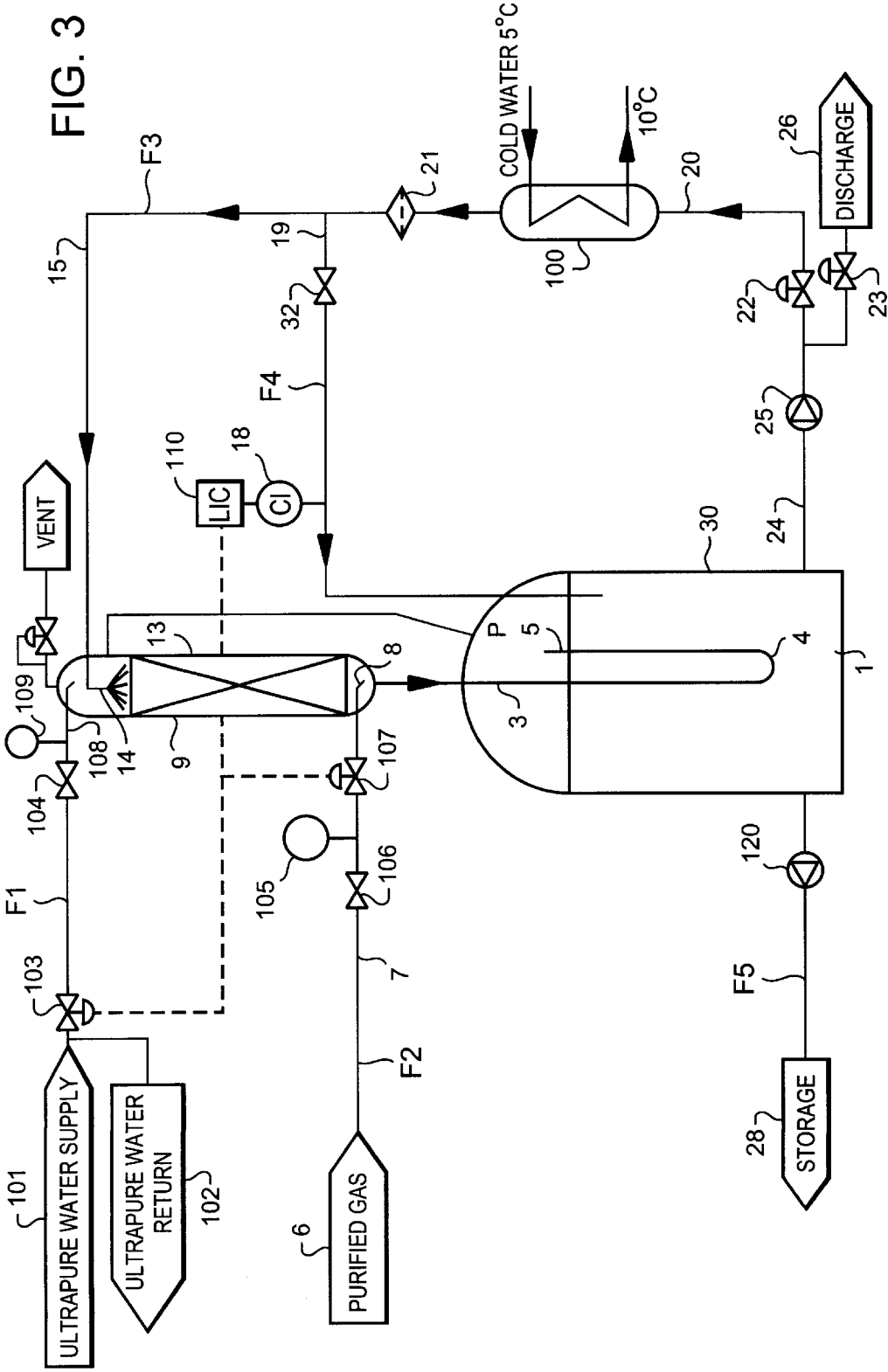
FIG. 3, a diagram showing the gas being continuously dissolved in the liquid.

FIG. 3 shows a diagram of a process for continuously dissolving the gas in the liquid, which continuous process allows the ultrapure chemical to be manufactured continuously. In this figure, the same components as those in the previous figures bear the same references.

This continuous manufacturing system has a few differences compared with that described in FIG. 1. A first difference is the presence of a heat exchanger (100) which has been placed here outside the vessel (30) as an illustration of a different way of cooling the solution and of keeping it at a temperature preferably between 20° C. and 25° C. This difference itself is not associated with the fact that the solution is produced continuously, as in this FIG. 3, or discontinuously, as in FIG. 1, but the two methods of heat exchange for cooling the solution and keeping it between 20° C. and 25° C. allow two different methods to be illustrated, either by using heat exchange in the bath or by using an exchanger placed outside the bath, which methods are applicable in both, continuous and batch, production situations.

The essential difference in this FIG. 3 compared to the apparatus described in FIG. 1 consists of continuous feed with ultrapure water (101 and 102), so as, when the valves (103, 104) are open, to feed ultrapure water continuously into the top of the column (13) having the packings (9). The purified gas (6), as in the case of FIG. 1, is supplied at the bottom of the column via an analogue flow meter (105) and two valves (106, 107) used to control the flow rate of purified gas and to deliver the required quantity for obtaining a solution having the desired titre. (The line (108) for supplying ultrapure water after the valve (104) also includes an analogue flow meter (109) in order to measure the flow rate of ultrapure water). When the concentration (or titre) of the solution, which circulates continuously, as previously, in the column and which is measured by the device (18), is equal to the initially programmed value, the controller (110) then closes the valves (103, 107) so as to stop the ultrapure-water feeds and the purified-gas feed, the product stored in the tank (30) then being sent to the storage container (28). In continuous operation, the various flow rates and pressures and methods of recirculating the products in the circuit are such that the product concentration is permanently equal to the desired value and such that the ultrapure chemical may thus flow, continuously or almost continuously, via the pump (120) into the storage container (28). By way of information, the flow rates for producing various products and in particular 50% hydrofluoric acid (HF 50), 5% hydrofluoric acid (HF 5), 35% hydrochloric acid (HCl 35) and 30% aqueous ammonia ($NH_4OH$ 30), can be as shown in the following Tables 1–4:

TABLE 1

FLOW RATE OF ULTRAPURE WATER AT F1

| Intended Product | Flow Rate, liters per hour |
|---|---|
| HF 50 | 58.3 |
| HCl 35 | 76.4 |
| $NH_4OH$ 30 | 66.1 |

TABLE 2

FLOW RATE OF PURIFIED GAS AT F2

| Intended Product | Flow Rate, standard liters per hour |
|---|---|
| HF 50 | 75263 |
| HF 5 | 6626 |
| HCl 35 | 25253 |
| $NH_4OH$ 30 | 37289 |

TABLE 3

FLOW RATE OF LIQUID AT F3

| Intended Product | Flow Rate, liters per hour |
|---|---|
| HF 50 | 5250 |
| HF 5 | 530 |
| HCl 35 | 2170 |
| $NH_4OH$ 30 | 1570 |

The temperature of the liquid at F3 can be 10–15° C.

TABLE 4

FLOW RATE OF LIQUID AT F4

| Intended Product | Flow Rate, liters per hour |
|---|---|
| HF 50 | 262 |
| HF 5 | 26 |
| HCl 35 | 108 |
| $NH_4OH$ 30 | 78 |

The flow rate of the chemical at F5 can be 100 liters per hour. The temperature of the chemical at F5 can be 20–25° C. Complying with these various flow rates makes it possible to obtain the products with the desired purity. In one exemplary embodiment, the chemical is 50% hydrofluoric acid, and a flow-rate ratio of the recycled portion of the product to the drawn-off portion of the product is between 80 and 260. In another exemplary embodiment, the chemical is 5% hydrofluoric acid with a flow-rate ratio of between 3 and 10. The chemical may also be 35% hydrofluoric acid with a flowrate ratio of between 20 and 65. In a further exemplary embodiment, the chemical is 30% aqueous ammonia with a flowrate ratio of between 18 and 60.

Figure 4:
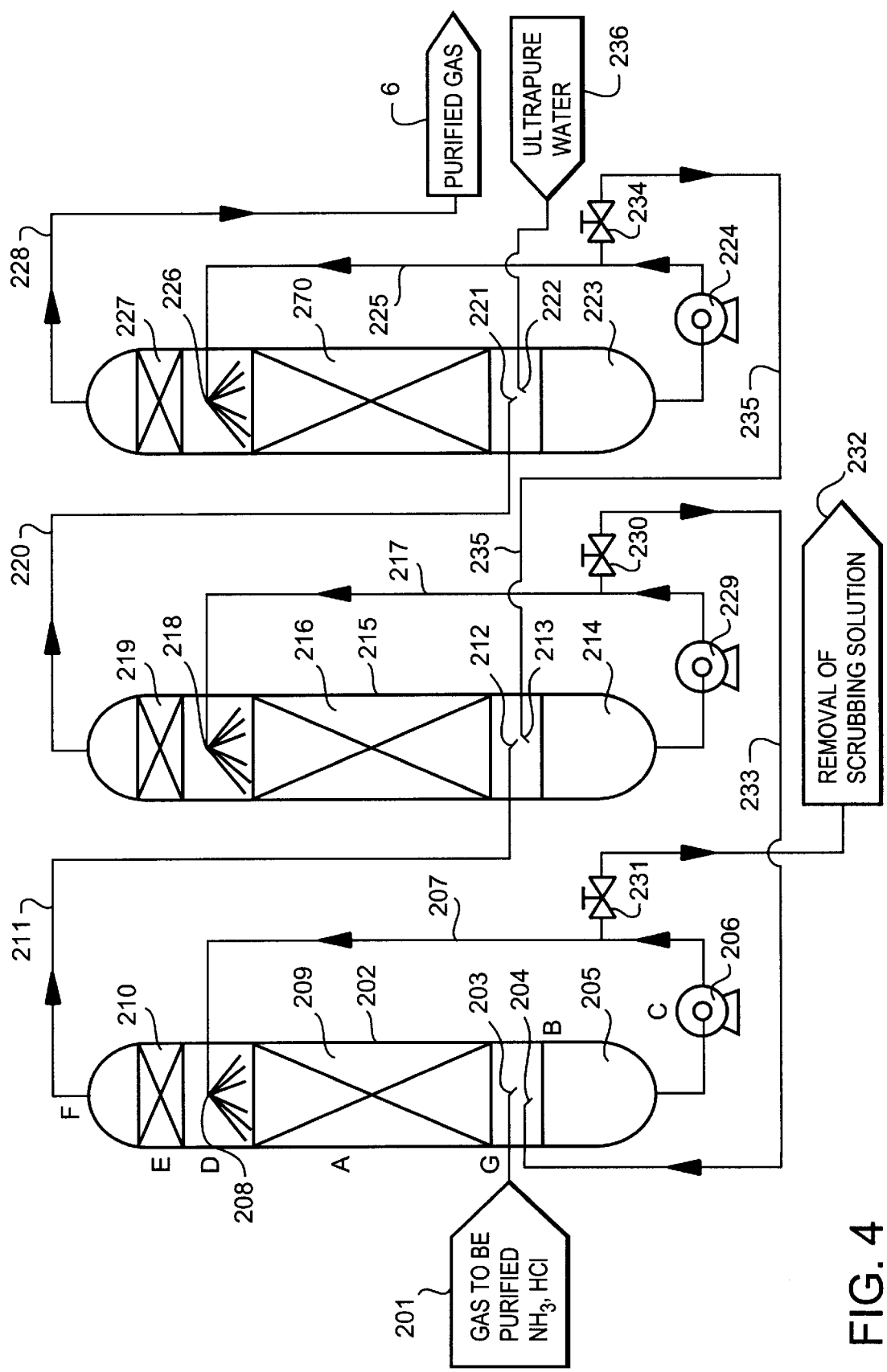
FIG. 4, a diagram showing three-column purification.

FIG. 4 shows diagrammatically a purification system for a chemical gas to be purified. The gas to be purified (201) is introduced via the nozzle (203) into the scrubbing column (202), the collector (205) of which contains a solution of water saturated with chemical gas and containing the gas scrubbings. The bottom of the collector is connected via a pump (206) and a line (207) to the top of the column (202) where the liquid recirculated by the pump (206) is delivered by a spray head (208) as a countercurrent to the gas to be purified which is injected by the nozzle (203) and which rises in the packings (209) where material exchange, between the gas and the liquid, occurs. At the top of the column, i.e. the upper part of the column (202), there is a mist eliminator 210 so as to filter out a certain number of impurities which could still remain in the gas and to condense the moisture which is in the latter. After this first purification stage, the gas is extracted via the top of the column through the line (211) and sent into the bottom part of the second column (215) via the nozzle (212) and a purification of the same type as in the previous stage is carried out by recirculating the liquid (214) via the pump (229) and the line (217), the liquid being sent as a countercurrent into the spray head (218) before coming into contact on the packings (216) in the column (215) with the gas which is rising in this column. At the top of this column there is also a mist eliminator (219) and the gas, of even higher purity, is sent via the line (220) into the third column which fulfils the same function as the two previous columns, that is to say that the gas is injected via the nozzle (221) as a countercurrent to the liquid flowing from the collector containing the liquid (223), the pump (224), the line (225) and the spray head (226) into the packings (270). Ultrapure water is introduced via the nozzle (222) coming from a tank (236) of ultrapure water, this water being sent into the collector (223). The fully purified gas passes through the mist eliminator (227) via the line (228) and is once more in the form of purified gas (6) as described in the previous figures. In this FIG. 4, the liquid flowing through the third column, i.e. that lying furthest to the right in FIG. 4, may be sent, by means of the valve (234) and the line (235), into the nozzle (213) which feeds into the collector of the second column (214) so as to recover the saturated liquid of this third column and send it into the second column where it will be recirculated as a counter-current to the gas. Likewise, on the circuit for recirculating the liquid in the collector (214) of the column (215) is connected a valve (230) so as to be able to draw off this liquid and send it via the line (233) into the nozzle (204) which itself feeds the liquid into the collector (205) of the column (202). This arrangement has the advantages, mentioned above, of speed and economy.

Figure 5:
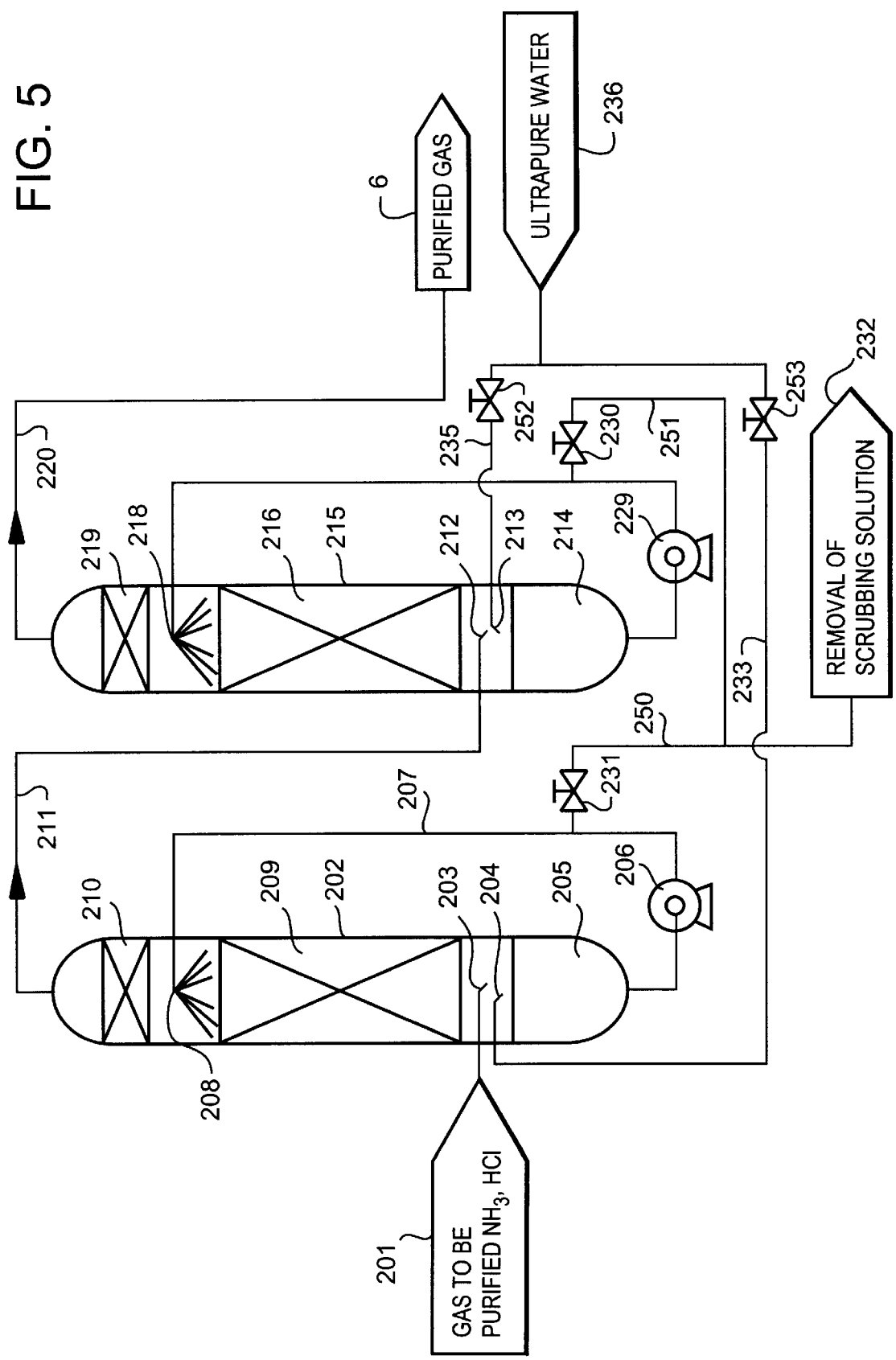
FIG. 5, a diagram showing two-column purification.

In FIG. 5 the same components as those in the previous figures bear the same references. In this figure, gas is purified by means of only two columns, the essential difference in this figure compared to FIG. 4 being that each of the two columns is fed directly with ultrapure water (236) by means of, respectively, the valves (252) and the line (235) so as to reach the nozzle (213) which feeds into the column (215) and, moreover, via the valve (253), the line (233) which feeds into the nozzle (204) which feeds liquid into the collector (205) of the column (202). Furthermore, the valves (231 and 230) are used, respectively, via the lines (250 and 251), to remove the scrubbing solution to (232) when it is necessary, especially when the scrubbing solution saturated with impurities must be replaced and the collectors refilled with ultrapure water. The spent scrubbing solution may be drawn off continuously or sequentially from the collector of each column at a rate which is about 0.1% to 5% of the rate at which the scrubbing solution is fed.

Figure 6:
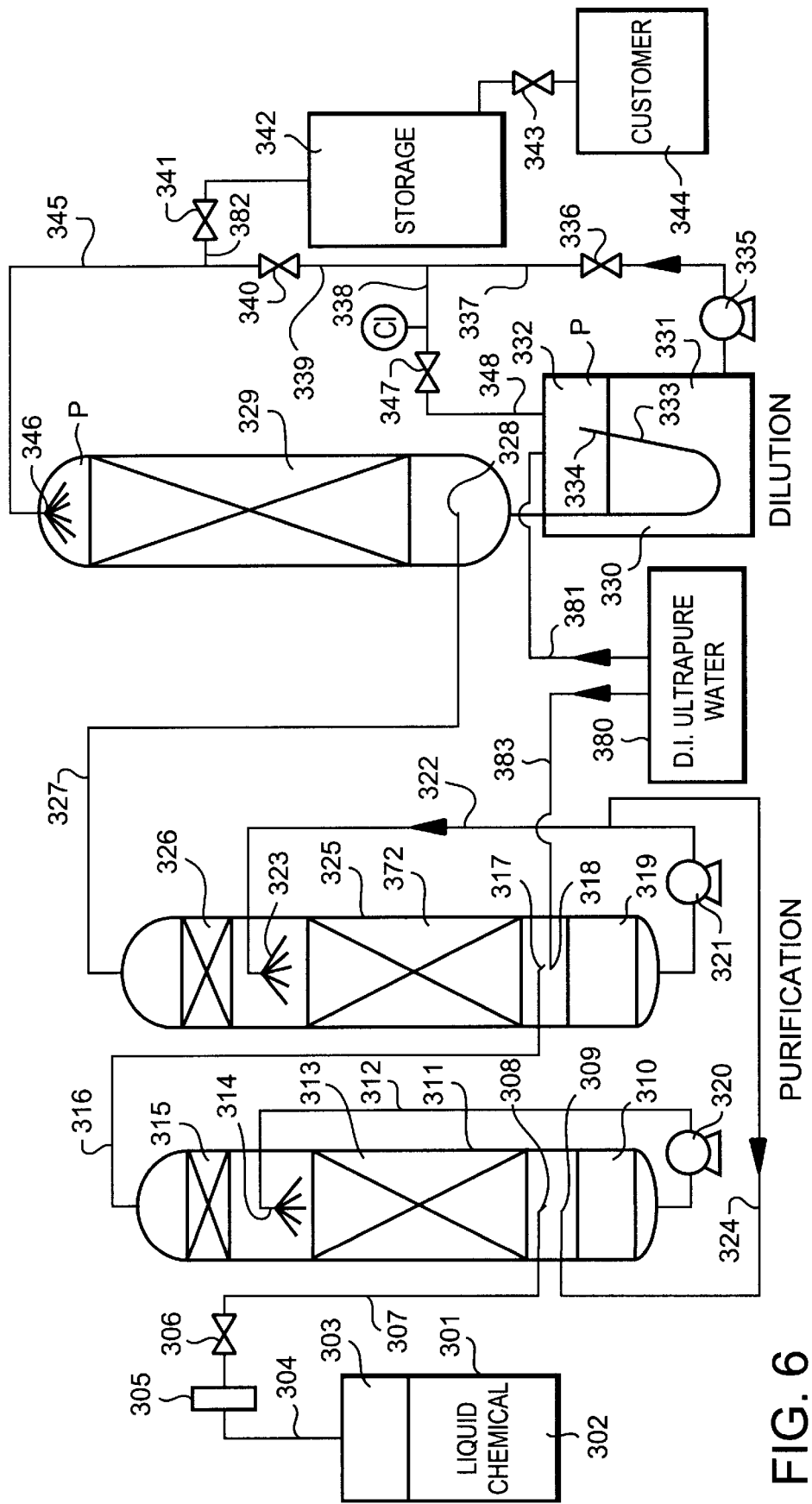
FIG. 6, an overall diagram of the apparatus with its various functions.

FIG. 6 is a diagrammatic representation of the entire apparatus according to the invention, comprising both the purification system and the dilution system. A container (301), holding a liquid chemical (302) above which is a gas overhead (303) of the same chemical, is connected via the line (304), the filter (305), the valve (306) and the line (307) to the nozzle (308) for injecting the gas drawn off from the gas overhead (303) in the container (301). The gas is then injected into the first purification column (311) as described previously, this gas rising as a countercurrent in the packings (313) to the liquid which comes from the collector (310) and which is circulated by the pump (320), the line (312) and the spray head (314). The collector itself is fed with liquid (324) coming, for example, from the liquid circulation circuit of the second column (325) (or alternatively, as in FIG. 4, the direct feed with deionized ultrapure water may be provided). After this first purification step in the column (311), the gas passes through mist eliminator (315) and is then taken, via the line (316), into the nozzle (317) at the base of the column (325), in which column it flows as a countercurrent to the liquid of the collector (319), this liquid flowing through the pump (321) to the line (322) and the spray head (323) through the packings (372) of this column (325). After this second purification step, and therefore having reached the desired degree of purity, the gas passes through the mist eliminator (326) and then, via the line (327) enters the nozzle (328) in the form of ultrapure chemical gas. In the dissolution column (329), this ultrapure chemical gas is injected at the base of the column as a countercurrent to the liquid recirculated by means of the spray head (346) through the packings (329) so as to produce a solution of liquid chemical having the desired concentration. The liquid enriched with ultrapure gas flows out into the capillary-type line (333) and, simply by gravity, gradually fills the container (330) by spilling out of the opening (334). Above the liquid (331) in this container (330) is a gas overhead (332) preferably of ultrapure nitrogen of electronic purity, while a tank of deionized ultrapure water (380) may feed, via the line (381) into the container (330) when this is necessary (see the description of the previous figures with regard to the operation). At the base of the container (330) is a circulating pump (335) which circulates the liquid gradually enriched with gas via the valve (336), the line (337), the line (339), the valve (340), the line (345) and then the spray head (346). The line (337) comprises a junction between the lines (339 and 337), this junction (338) being used to measure the titre by means of the device CT in the figure so that the titre of the solution is continually checked until the desired titre is achieved. In order to measure its titre without any physical contact, the solution thus recirculated is sent via the valve (347) into the container (330). Again, after the valve (340), there is a line (382) which makes it possible, by means of the valve (341) to store the chemical at the desired titre in the storage container (342), the latter being connected, via the valve (343), to the point of use by the customer (344). The tank (380) of deionized ultrapure water is also connected via the line (383) to the nozzle (318) which is used to inject this water into the collector (319) of the column (325). There is also a line (324) for drawing off and recycling the impurity-enriched solution, when this is necessary, into the collector (310) of the first purification column.

EXAMPLE 1

This example is shown in FIGS. 1 and 2. This involves a vertical column filled with a packing whose nature is to increase, to the maximum, the gas/liquid interfacial area, such as therefor Raschig rings, or "Pall"-type partitioned rings, or balls, or saddles. The dissolving liquid is injected at the top of the column and the purified gas to be dissolved at the bottom. The liquid flows into the reactor via a U-tube, the free branch of which emerges above the surface of the liquid.

This U-tube acts as a hydraulic valve which forces the gas to be dissolved to pass through the packings in the column.

A circulating pump takes up the liquid and reinjects it into the top of the absorption column at a flow rate such that the heating due to dissolving the gas remains compatible with the final concentration of the chemical to be obtained. The recirculation loop is equipped with a filter. The gas overhead in the reactor is connected to the top of the column via a line in order to equalize the pressures therein. The top of the column is connected via a safety valve to a vent.

The column is made of a plastic which is resistant to corrosion and compatible with the high purity desired for the chemicals: the same applies to the packing. A plastic heat exchanger is placed in the container which holds the chemical beneath the column or at the output of the pump feeding the column; in this case, a major portion, greater than 70%, of the liquid must be sent directly to the container which collects the chemical. Alternatively, a major portion of the cooled liquid, greater than 70% by volume, is fed into the dissolution column and the other portion is recycled directly into a container which collects the chemical. The secondary plastic exchanger is fed with deionized water cooled by the glycol water in a stainless steel (primary) exchanger as in FIG. 2. The deionized water is continually replaced via a feed downstream of the circulating pump of the loop and the draw-off is adjusted so as to be able to have minimum ion contamination in the loop: thus, should there be a leak in the plastic exchanger, contamination of the chemical is avoided.

A filter is placed on the output side of the pump, downstream of the exchanger. Fitted into the circuit for return to the collector container is the process analyser (and its controller) which measures the concentration of the chemical.

EXAMPLE 2

This example is shown in FIG. 3. The preferred implementation of this continuous dissolution process includes:
a packed absorption column, a collector buffer container under the column and a cooling circuit which comprises a pump, a heat exchanger and a filter.

Furthermore, in this example, there is a circuit for direct return to the buffer container which can take, for example, from 2 to 10% of the output of the cooling circuit. The circuit includes a flow control valve, a concentration transmitter, and a concentration regulator (of the PID type) controlling the valve for regulating the purified-gas feed circuit, and an absorption-column feed circuit into which 90% to 98% of the output of the cooling circuit flows, a discharge pump which extracts the end-product from the buffer container and sends it into the storage tanks, a purified-gas feed circuit comprising a transmitter flow rate, a control valve slaved to the analyser and an ultrapure-water feed circuit which includes a flow control valve and a transmitter flow meter.

In a variant, the exchanger may be fitted directly in the buffer container under the absorption column, the high heat of solution of the gases such as HF, HCl or NH3 requiring the absorption column to operate at a high solution flow rate so as to remove the heat without raising the temperature excessively, which could have consequences for the titre of the solution produced. FIG. 3 gives the flow rates in order to achieve 100 liters per hour of solution, for example for 50% hydrofluoric acid (HF 50), 5% hydrofluoric acid (HF 5), 35% hydrochloric acid (HCl 35) and 30% NH4OH aqueous ammonia (NH4OH 30).

EXAMPLE 3

Two variants of this example are shown in FIGS. 4 and 5. Since the mist eliminator at the top of the column, as described in U.S. Pat. No. 5,496,778, has a limited effectiveness, various solutions are provided by the invention.

In order to improve the purity further, rather than increasing the volume of the column, according to the invention a second column is used in series. The saturated scrubbing solution will have a lower purity level than that of the first. The aerosol inevitably entrained will have a much lower concentration of metallic impurities (by a factor of approximately) than in the first column—the solution produced by dissolving the gas after the second column will itself therefore be much purer than that produced by a purification apparatus having a single column. A one-column system makes it possible to obtain a level of metallic impurity of about 10 ppb for each cation: with an apparatus according to the invention having at least two columns in series, a purity of better than 100 ppt may be achieved. Preferably, each of the scrubbing columns comprises packings, a tank collecting the scrubbing solution, a pump sending the scrubbing solution to the top of the column, a spray nozzle or any other device for distributing the scrubbing solution, a mist eliminator located above the inlet for the scrubbing solution, a purified-gas outlet at the highest point on the column, an inlet for gas to be purified, this being located below the packing in the column, a supply of high-purity deionized water and a valve for removing the spent scrubbing solution.

The spent scrubbing solution may be removed at each column (FIG. 5), and this results in a loss of chemical; it is preferable for the deionized water to be introduced into the final column (the furthest downstream in the process) and for the scrubbing solution to flow from column to column as a countercurrent to the gas to be purified (FIG. 4).

It may be useful, for controlling the process, to fit an exchanger, cooled by cold water, in the container which collects the scrubbing solution.

What is claims is:

1. Process for producing a high-purity liquid chemical comprising the steps of:
   successively purifying a chemical gas over first and second purification columns by passing, countercurrently, a scrubbing solution of initially deionized high-purity water through said first and second purification columns, or by passing, countercurrently, a first scrubbing solution of initially deionized high-purity water through said first column and a second scrubbing solution of initially deionized water through said second column, wherein each of said scrubbing solutions gradually becomes a spent scrubbing solution loaded with impurity, wherein a high-purity chemical gas leaves the second purification column with a low content of metallic elements;
   subsequently dissolving the high-purity chemical gas in a liquid in a dissolution column including a top and a bottom;
   collecting and continuously recirculating the liquid at the bottom of the dissolution column which is enriched with purified chemical gas, thereby forming a high-purity liquid chemical; and
   subsequently distributing the high-purity liquid chemical when a desired concentration of dissolved gas has been reached.

2. Process according to claim 1, further comprising the step of circulating the liquid which is enriched with purified chemical gas in a circuit including a heat exchanger to obtain a cooled liquid enriched with purified chemical gas and feeding a major portion of the cooled liquid, greater than 70% by volume, into the dissolution column and recycling the other portion directly into a container which collects the chemical.

3. Process according to claim 2, further comprising feeding the exchanger with regularly replenished cold deionized water.

4. Process according to claim 3, further comprising cooling the deionized water by glycol water in a plate or tube exchanger.

5. Process according to claim 1, further comprising purifying the gas to a desired level of purity in at least two successive columns, the number of columns depending on the desired level of purity, introducing gas to be purified leaving the top of one column into the bottom of the other, dissolving the gas to be purified in the high-purity deionized water.

6. Process according claim 1, wherein each column has a collector, further comprising purging of the spent scrubbing solution which may be drawn off continuously or sequentially from the collector of each column at a rate which is about 0.1% to 5% of the rate at which the scrubbing solution is fed.

7. Process according to claim 1, further comprising purging the spent scrubbing solution from one column to the other as a countercurrent to the gas so as to limit losses of gas dissolved in the scrubbing solution.

8. Process according to claim 1, further comprising cooling the scrubbing solution by a heat exchanger.

9. Process according to claim 1, wherein the liquid into which the high purity chemical gas is dissolved is water.

10. Process according to claim 9, further comprising regulating an injection of a continuous supply of water by analysing the titre of the liquid enriched with purified chemical gas and stopping the water injection when the titre is obtained, and wherein the process is operated continuously.

11. Process according to claim 9, further comprising dissolving the chemical gas in the water continuously to form a dissolved product and generate a heat of reaction, regularly removing the heat of reaction so as to keep the temperature of the product between about 20° C. and 25° C., recycling a portion of the product and drawing off a portion of the product in a ratio of flow rates of solutions so as to keep the temperature of the product within this same range.

12. Process according to claim 11, wherein the chemical is 50% hydrofluoric acid, and wherein a flow-rate ratio of the recycled portion of the product to the drawn-off portion of the product is between 80 and 260.

13. Process according to claim 11, wherein the chemical is 5% hydrofluoric acid, and wherein a flow-rate ratio of the recycled portion of the product to the drawn-off portion of the product is between 3 and 10.

14. Process according to claim 11, wherein the chemical is 35% hydrochloric acid, and wherein a flow-rate ratio of the recycled portion of the product to the drawn-off portion of the product is between 20 and 65.

15. Process according to claim 11, wherein the chemical is 30% aqueous ammonia, and wherein a flow-rate ratio of the recycled portion of the product to the drawn-off portion of the product is between 18 and 60.

16. Process according to claim 1, wherein said purification columns include packing.

17. Process according to claim 16, wherein a container is located under each purification column, said containers having a volume between 2 and 5 times the quantity of liquid which the packing in the column can retain, so as to limit quantities of gas lost by dissolving in the columns.

18. Process according to claim 1, wherein the liquid at the bottom of the dissolution column is recirculated to the top of the dissolution column.

* * * * *